United States Patent
Soman et al.

(10) Patent No.: US 7,289,937 B2
(45) Date of Patent: Oct. 30, 2007

(54) METHOD AND APPARATUS FOR MACHINE VECTOR LOOP EXTRACTION

(75) Inventors: Narendra Amalendu Soman, Niskayuna, NY (US); Murali Mohan Reddy Nagella, Andhra Pradesh State (IN); N. Deva Prasanna Kumar, Andhra Pradesh State (IN); Chandrakant Naik Tari, Goa (IN)

(73) Assignee: General Electric Company, Niskayuna, NY (US)

( * ) Notice: Subject to any disclaimer, the term of this patent is extended or adjusted under 35 U.S.C. 154(b) by 247 days.

(21) Appl. No.: 10/750,492

(22) Filed: Dec. 31, 2003

(65) Prior Publication Data

US 2005/0149298 A1   Jul. 7, 2005
US 2006/0253269 A9   Nov. 9, 2006

Related U.S. Application Data

(63) Continuation-in-part of application No. 10/065,742, filed on Nov. 14, 2002, now Pat. No. 6,826,510.

(51) Int. Cl.
G06F 11/30 (2006.01)

(52) U.S. Cl. .................................... 702/183
(58) Field of Classification Search ................ 702/155, 702/183; 703/1; 700/97
See application file for complete search history.

(56) References Cited

U.S. PATENT DOCUMENTS 5,581,466 A    12/1996 Van Wyk et al.
6,351,721 B1    2/2002 Werner et al.
6,507,806 B1 *  1/2003 Tandler .......................... 703/1
2004/0030427 A1 *  2/2004 Drake et al. .................. 700/97
2004/0098220 A1 *  5/2004 Gong et al. .................. 702/155

OTHER PUBLICATIONS

Chase, Kenneth W., et al; "Tolerance Analysis of 2-D and 3-D Mechanical Assemblies with Small Kinematic Adjustments"; Dept. of Mechanical Engineering, Brigham Young University, Provo, Utah; pp. 1-36; date unknown.
P. Treacy, et al., "Automated tolerance analysis for mechanical assemblies modeled with geometric features and relational data structure", Computer Aided Design, vol. 23, No. 6, Jul. 1991.
J. Birgand et al., "Technologie de Conception Mecanique" Ecole Central De Nantes, XP002355744, pp. 18-23. (with English translation provided).

* cited by examiner

Primary Examiner—John Barlow
Assistant Examiner—Aditya S. Bhat
(74) Attorney, Agent, or Firm—Ann M. Agosti; Patrick K. Patnode (57) ABSTRACT

A method and apparatus for performing a gap stack-up analysis for a machine gap. The gap is defined by opposing faces of two machine parts. A vector loop is determined beginning at one of the opposing faces, traversing through the machine parts that affect the gap dimension and terminating on the other opposing face. The dimensions and the tolerances associated with each of the parts in the vector loop are combined to yield the gap dimension and the gap tolerance. In one embodiment the gap stack-up is determined by a computer program product for execution by a computer processor.

28 Claims, 8 Drawing Sheets

METHOD AND APPARATUS FOR MACHINE VECTOR LOOP EXTRACTION

This application is a Continuation-In-Part of application Ser. No. 10/065,742, filed Nov. 14, 2002, and which issued on Nov. 30, 2004 as U.S. Pat. No. 6,826,510 B2.

FIELD OF THE INVENTION

The present invention relates generally to machine part dimension tolerances and in particular relates to a process and apparatus for performing a gap stack-up analysis for interfacing machine parts to determine the gap nominal dimension and gap tolerance.

BACKGROUND OF THE INVENTION

In operating machines, each part dimension (a dimension is a numerical value that defines the size, shape or location of a feature) and the distance between spatially-opposed parts (i.e., a gap) must be maintained within design tolerances for efficient and reliable machine operation. For example, an aircraft engine includes between about 10,000 and 40,000 parts, each described by one or more two-dimensional drawings illustrating the part geometry, nominal part dimensions, part tolerances and other required part characteristics (e.g., material from which the part is to be constructed and non-observable properties such as tensile strength or hardness). The tolerance values specify an acceptable range of variation from the nominal part dimension.

Each part is manufactured in accordance with the information set forth in the drawings (i.e., each drawing is a two-dimensional representation of the part), including conformance to the part nominal dimensions and the tolerances associated with each dimension. A part having an actual dimension outside the specified tolerance range may not be suitable for use in the machine as it may not properly mate or interface with another part or may physically interfere with the operation of another part. A single part can be governed by a plurality of tolerances, each tolerance related to a different geometric feature of the part. For example, the drawings for an aircraft engine gas turbine blade may include as many as four hundred dimension tolerances.

As the individual parts are assembled to form the machine, gaps (defined generally as a linear distance between two planes or surfaces in the machine) between parts must be maintained within design limits. A nominal gap distance represents the desired gap opening. A gap tolerance indicates a range of acceptable variations from the nominal gap distance. For example, in a gas turbine jet engine combustion gases impinge upon a plurality of blades carried by a spinning rotor enclosed within a stationary stator. Maintaining a specified gap (as defined by the nominal gap distance and a tolerance range associated with the gap distance) between a tip of each rotor blade and the stator is necessary for proper and efficient operation of the engine. Typically, the gap tolerance is measured in ten-thousandths of an inch. A gap outside the tolerance range by one ten-thousandth of an inch can significantly affect several important operational parameters, such as engine fuel efficiency.

Dimension tolerance stack-up analysis is a process of using given machine part dimensions and part tolerances to predict the dimension and tolerance of an assembly dimension between two mating or adjoining parts, e.g., to predict the nominal dimension and tolerance of a machine gap. The gap between the blade tip and the stator is an example of a gap subject to stack-up analysis. Critical gaps are subject to stack-up analysis during the machine design phase to ensure proper machine operation. In a typical steam turbine there are about 130-180 critical gap stack-ups that can affect turbine performance. In a typical aircraft engine there are more than 2000 such stack-ups.

The stack-up analysis is important for improving quality and reducing production costs o the machine. Design engineers favor a tight tolerance on each machine dimension, requiring close dimensional control during the manufacturing process. But the dimensional control adds costs to the manufacturing process. Thus a quantitative analysis of the machine dimensions and the tolerance associated with each dimension provides important insight into design and manufacturing processes, allowing informed trade-offs between their competing interests.

To perform the gap stack-up analysis and thereby determine the nominal gap dimension and the gap tolerance for a given machine gap, it is necessary to first identify the interfacing or mating parts and the dimensions of those parts that create the gap, i.e., a gap vector loop. These part dimensions form a loop beginning at one gap surface, traversing through serial part interfaces until reaching the opposing gap surface. The part dimensions and part dimension tolerances associated with each such loop part are then combined to yield the gap nominal dimension and the gap tolerance.

According to the prior art, the gap stack-up analysis process is performed manually. A gap of interest is identified and the drawing(s) for each part that affects the gap dimension is retrieved. Each part drawing is examined to determine the nominal part dimensions that affect the gap and the tolerance associated with each such dimension. The nominal part dimensions and part dimension tolerances are recorded. Each dimension is further assigned a multiplication factor (typically +1 or −1) based on whether the dimension value increases or decrease the gap dimension.

The manual gap stack-up process is complicated by the necessary reliance on two-dimensional drawings to determine contributions to a three-dimensional gap. The engineer performing the stack-up process must therefore have considerable familiarity with the machine and the spatial relationship of its constituent parts to perform an accurate stack-up measurement. The manual stack-up process is extremely time-consuming, usually requiring between about 10 and 30 hours of analysis for one machine gap. Mistakes are easily made, as the number-intensive nature of the process is prone to errors, such as the transposition of two adjacent digits in a tolerance value. Also, accurate extraction of the vector loop is a difficult process to perform manually. This process is further complicated if multiple vector loops exist. In these circumstances, the engineer may be unaware of the existence of such multiple vector loops and extraction of all vector loops is not performed, which results in inaccurate stack-up results. Once completed, it is desired to validate the vector loop (i.e., the parts and their surfaces that form the vector loop) and the stack-up results. However, there are no known validation techniques, short of having the stack-up analysis repeated by another engineer.

Today, most machines and their constituent parts are designed using computer-aided design (CAD) software that creates three dimensional images or models of each part, including nominal part dimensions, but typically excluding tolerance values for the nominal dimensions. Upon completion of the design, a prototype machine is assembled from prototype parts based on the software-generated design data.

Only later, after the two-dimensional drawings are created for each part and the dimension tolerances determined, can an engineer perform a stack-up analysis. However, given the protracted process for creating the two dimensional drawings and conducting a stack-up analysis, the analysis may not be completed until after prototype parts have been assembled into a prototype machine. The lack of a tolerance stack-up analysis during part fabrication and machine assembly may result in a prototype machine that does not perform as expected due to out-of-tolerance part gaps. Upon discovery of an out-of-tolerance gap, the affected part tolerances must be modified, the part refabricated in accordance with the corrected tolerance values and assembled into the machine. Correction of these problems during the design and fabrication cycle adds unwanted costs to the product, and correction costs increase as the design and fabrication cycle nears an end.

BRIEF SUMMARY OF THE INVENTION

The present invention comprises a method for determining a one-dimensional gap stack-up for a gap within an assembly of parts. The method further comprises identifying a gap for stack-up analysis and identifying a first surface and a second surface defining the gap, wherein a first part of the assembly of parts comprises the first surface and a second part of the assembly of parts comprises the second surface. The method further comprises determining a vector loop comprising a plurality of elements from the first surface through the assembly of parts to the second surface, wherein the plurality of elements comprise the gap stack-up. The invention further comprises a computer program product for performing a one-dimensional gap stack-up for a gap within an assembly of parts, the computer program product comprises a storage medium readable by a computer processor and storing program code for execution by the computer processor. The program code comprises a program code module for identifying a gap for stack-up analysis, a program code module for identifying a first surface and a second surface defining the gap, wherein a first part of the assembly of parts comprises the first surface and a second part of the assembly of parts comprises the second surface, and a program code module for determining a vector loop comprising a plurality of elements from the first surface through the assembly of parts to the second surface, wherein the plurality of elements comprise the gap stack-up.

BRIEF DESCRIPTION OF THE DRAWINGS

The foregoing and other features of the invention will be apparent from the following more particular description of the invention, as illustrated in the accompanying drawings, in which like reference characters refer to the same parts throughout the different figures. The drawings are not necessarily to scale, emphasis instead being placed upon illustrating the principles of the invention.

DETAILED DESCRIPTION OF THE INVENTION

Before describing in detail the particular process and apparatus for performing a machine or parts assembly gap stack-up analysis in accordance with the present invention, it should be observed that the present invention resides primarily in a novel and non-obvious combination of hardware elements and process steps. Accordingly, these elements and steps have been represented by conventional elements and steps in the drawings, showing only those specific details that are pertinent to the present invention, so as not to obscure the disclosure with structural details that will be readily apparent to those skilled in the art having the benefit of the description herein.

A nominal dimension (either a nominal part dimension or a nominal gap dimension) indicates the desired value for the dimension. If some dimensional variation is permitted, a plus and/or minus tolerance value is associated with the nominal dimension. Thus a measurement can be expressed as a nominal dimension and a plus/minus tolerance. The nominal dimension value represents a mean value for the measurement, and the tolerances relate to the standard deviation about the mean. For example, a part dimension of 3.000 inches ±0.002 inches (referred to as a bilateral symmetrical tolerance) has a mean value of 3.000 inches, a maximum tolerance of +0.002 inches and a minimum tolerance of −0.002 inches. A part dimension of 4.075 inches +0.004 inches and −0.002 inches (referred to as a bilateral asymmetrical tolerance) has a mean of dimension 4.076 (calculated by determining the average of the nominal dimension plus the positive tolerance value, and the nominal dimension minus the negative tolerance value), a maximum tolerance of +0.003 inches and a minimum tolerance of −0.003 inches (as determined by averaging the dimensional tolerance values).

The gap stack-up analysis of the present invention is described below in terms of cylindrical coordinates, e.g., axial, radial and angular directions. As can be appreciated by those skilled in the art, the teachings can also be applied to stack-up analyses preformed using other coordinate systems, such as the x, y and z axes of a Cartesian coordinate system.

According to the teachings of the present invention, the gap stack-up analysis is performed using nominal part dimension and/or tolerance information determined during the machine design process. The analysis process begins by identifying a machine gap of interest, as defined by a first gap surface of a first part and a second gap surface of a second part, wherein the first and the second surfaces are in a spaced-apart relation to form the gap.

A gap vector loop is then determined or extracted. The vector loop comprises a dimensional loop that begins on the first gap surface, extends through the first part, continues serially through and between all mating parts that affect the gap dimension/tolerance and ends on the second gap surface. The result thus comprises a list of loop elements each comprising a vector loop segment. The loop can be traversed in either direction, i.e., starting at the first gap surface and progressing through the loop to the second gap surface, or in the opposite direction.

After a vector loop extractor determines the loop, each part or element in the loop and the nominal dimension for each part are identified. The nominal gap dimension is determined by combining the nominal or mean part dimension for each loop element, including both dimensions between loop elements and within each loop element A gap mean can be determined as the sum of weighted nominal part dimensions (where a weight value of +1 or −1, as discussed further below, accounts for the affect of the part dimension on the gap dimension).

To complete the stack up analysis, the tolerance associated with each nominal part dimension in the loop is determined and the tolerance values combined to produce a gap tolerance. According to an embodiment of the invention, the gap variation or tolerance can be calculated using either one or both of two methods. For a worst case analysis the tolerances of all part dimensions are added to yield a worst case gap tolerance. Alternatively, a statistical analysis is employed in which the standard deviation of each part dimension is calculated (assuming a given relationship between the standard deviation or sigma value and the part tolerance, typically a 3-sigma value is used, i.e., the standard deviation=tolerance/3). The standard deviation of the gap is thus the square root of the sum of the squares of all the standard deviations of all part tolerances in the vector loop. This methodology is referred to as the root sum of the squares technique.

In a preferred embodiment, the stack-up analysis is performed by a computer software program. In one embodiment, the software program is operative in conjunction with a CAD design package employed to design the part. The invention thus extracts a one-dimensional vector loop from the three-dimensional CAD model to create the gap stack-up.

In yet another embodiment, the vector loop extraction results are imported to a spreadsheet for displaying the elements or parts of the vector loop (by part number, for example), the nominal dimension for each loop element and the weighted sum of the nominal dimensions, representing the nominal gap dimension. The dimension tolerance information for each loop element is also displayed in the spreadsheet.

According to the teachings of the present invention, the stack up information is determined faster than the prior art manual process, and is available earlier in the machine design process, since it is unnecessary to await creation and issuance of the part drawings. As described above, the vector loop extraction can be performed using the CAD design information. Whenever the tolerance values are assigned by the machine designer, they can be easily imported into the stack-up analysis spreadsheet to determine the gap tolerance. Advantageously, if the tolerance stack-up results indicate a potential problem with the gap tolerance or gap dimension, part dimensions can be changed during the design cycle and the affects of such changes on the interface and mating surfaces can be determined before the final design is completed. The final drawings may not be issued until the stack-up analyses for the assembly or parts are determined to be acceptable.

The vector loop extractor of the present invention can provide a visual display of the 3-dimensional representation of the vector loop, permitting the design engineers to verify the validity of the extracted loop. In one embodiment the vector loop is superimposed over the three-dimensional model of the CAD system. Obviously such a visualization is impossible when the stack up analysis is performed by consulting individual two-dimensional drawings according to the manual process. Given the large number of parts in certain machines, such as an aircraft engine with between 10,000 and 40,000 parts, manual gap analysis of each gap is virtually impossible, given the large number of gaps and the complexities of the part interfaces and their spatial relationships. The vector loop extractor of the present invention, when implemented in software, is not so limited as it derives the vector loop information directly from the three-dimensional CAD drawings. Finally, stack-up analyses performed by computer software will have fewer errors than manually performed stack-ups, which is based on the experience level of the engineer performing the manual stack-up analyses.

Elements within the gap vector loop comprises one of two types, an element between two machine parts and an element within a machine part. Both of these loop elements have an associated nominal part dimension and a dimension tolerance. In one embodiment the two loop component types are analyzed separately to determine the dimension/tolerance, after which the dimension/tolerance values are combined. In another embodiment the loop is traversed serially between parts and within parts as the element is encountered, and the gap nominal dimension and tolerance is provided at the conclusion of the loop traversal process.

Figure 1:
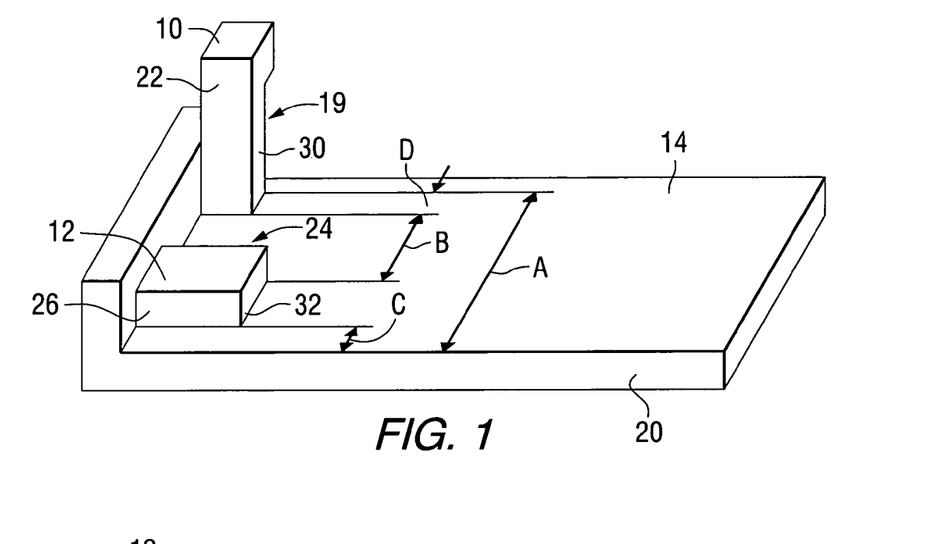
FIG. 1 is perspective view of parts suitable for determining a gap stack-up according to the teachings of the present invention.

FIG. 1 illustrates blocks 10 and 12 disposed on a tray 14. It is desired to extract the vector loop and the gap nominal dimension/tolerance for gap A between a hidden surface 19 of the block 10 and a surface 20 of the tray 14. Inter-part dimension/tolerance B (between a surface 22 of the block 10 and a hidden surface 24 of the block 12) and inter-part dimension/tolerance C (between a surface 26 of the block 12 and the surface 20 of the tray 14) are within the vector loop. The intra-part dimensions/tolerances in the loop include the distance/tolerance between the hidden surface 19 and the surface 22 (also referred to as a dimension D), and the surface 32 as defined below.

Figure 2:
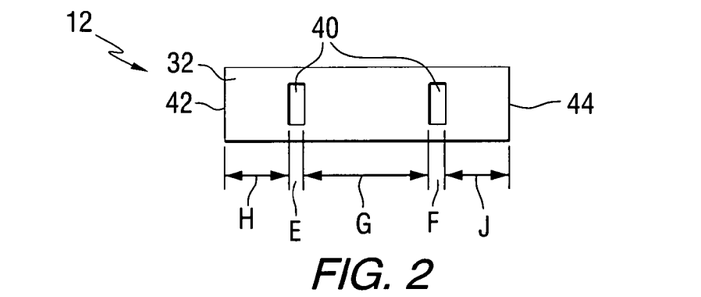
FIG. 2 is an elevation view of one of the parts of FIG. 1.

The surface 32 includes two grooves 40 as illustrated in FIG. 2. (Note that it is not required that the surface 32 be perpendicular to other surfaces of the block 12, a perpendicular orientation is merely exemplary). In this example it is assumed that there is no single dimension/tolerance directly defining a distance between surfaces 42 and 44. Instead the designer has provided dimensions and tolerances for the groove width (dimensions E and F in FIG. 2), the distance G between the grooves 30, the distance H from the surface 42 to the first groove 30 and the distance J from the second groove 30 to the surface 44.

To determine the gap stack-up for the dimension/tolerance A, the nominal dimension/tolerance associated with each of the dimensions/tolerances D, B, C, E, F, G, H and J are added. Note that in this example each of the dimensions/tolerances contribute positively to the gap stack-up. That is, if the dimension/tolerance for any of D, B, C, E, F, G, H and J is increased, there is a corresponding increase in the gap stack-up results. Similarly, if the dimension/tolerance for any of the dimensions D, B, C, E, F, G, H and J is decreased, there is a corresponding decrease in the gap stack-up.

Figure 3:
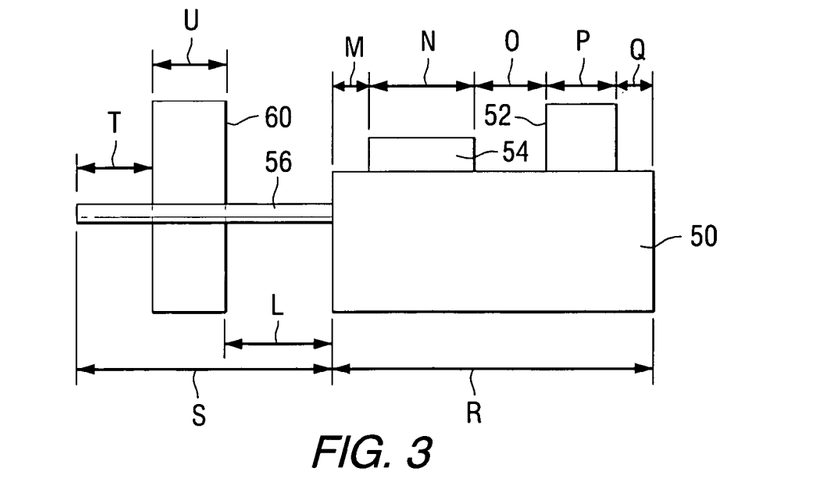
FIG. 3 is an elevation view of parts suitable for determining a gap stack-up according to the present invention.

In another exemplary stack-up process, FIG. 3 illustrates an elevation view of interfacing blocks 50, 52 and 54 oriented as shown, with a rod 56 extending from the block 50 through a hole in a plate 60. The gap stack-up analysis process is employed to determine the dimension/tolerance for the gap L. The nominal dimension/tolerance for each of distances M, N, O, P, Q, R, S, T and U affect the dimension/tolerance for gap L. Note that the dimension T inversely (or negatively) affects the gap dimension. That is, if the dimension of T decreases the gap L increases, and vice versa. To account for such positive and negative influences on a gap of interest, the positive-influencing gap dimensions are multiplied by a +1 factor, and the negative-influencing gap dimensions are multiplied by a −1 factor. The products resulting from the multiplications (i.e., the factored dimensions) are summed to yield the gap stack-up dimension.

In other embodiments of the invention, numerical values other than +1 and −1 can be used to represent changes in part dimension/tolerances. For example, as the part is heated/cooled, expansion/contraction effects change the part dimensions/tolerances. Flexibility and/or compressibility of parts can also be factored into the gap stack-up analysis by the use of coefficients other than +1 and −1.

Figure 4:
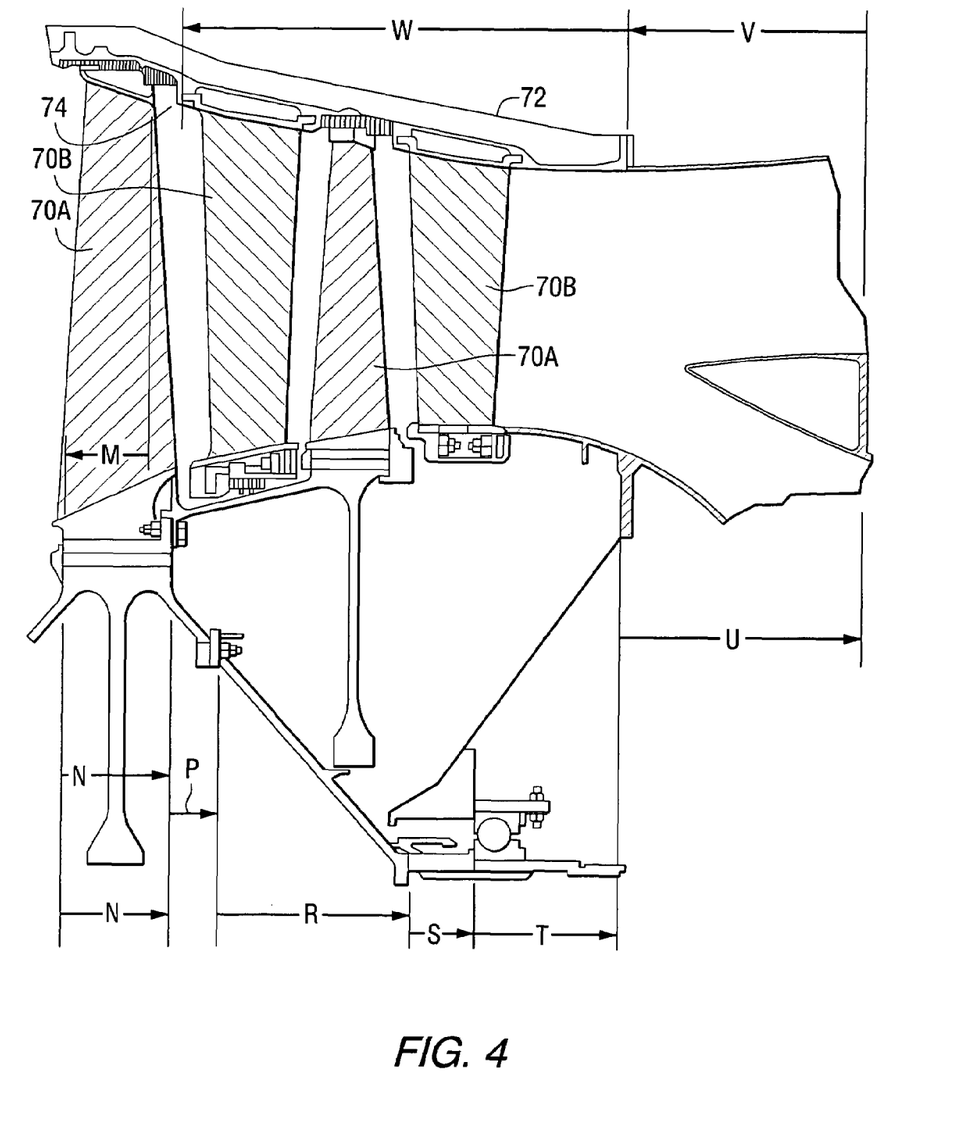
FIG. 4 is a simplified view of interior elements of an aircraft engine to which the teachings of the present invention can be applied.

FIG. 4 illustrates certain internal components, including turbine blades 70A, turbine vanes 70B and a case 72, of an aircraft engine. A gap stack-up for an axial gap 74 is performed using the dimensions/tolerances in a vector loop that defines the gap 74. These dimensions and the associated tolerances are identified by alphabet letters M, N, P, R, S, T, U, V and W. Arrowheads associated with each dimension/tolerance indicate the direction of traversal through the loop. Arrowheads pointing to the right indicate dimensions/tolerances that positively affect the gap stack-up. Dimensions/tolerances having left-pointing arrowheads negatively affecting the gap stack-up. Although the dimensions/tolerances of interest are all shown in FIG. 4, in practice each of the parts illustrated in FIG. 4 is described in several detailed drawings with a plurality of dimensions and tolerances describing the part. Also, certain of the dimensions/tolerances illustrated in FIG. 4 may represent a combination of gaps between component parts and dimensions/tolerances within parts. For example, the dimension/tolerance W may not be referred to directly in any of the drawings, but instead, the W represents a stack-up of dimensions and tolerances for parts that span the distance identified by the dimension W.

As described above, the mean value for a gap distance is obtained by summing the nominal dimensions associated with each part or element in the gap vector loop, after multiplication by the weighting factor. Additionally, the gap stack-up process produces a gap tolerance as described in detail below. Since a nominal part dimension represents a mean value for the measurement, and variations about this mean are random within the specified tolerance range, the gap stack-up process can be analyzed statistically. Further, the dimensional attributes of the individual machine parts, when formed into assemblies, accumulate statistically, causing the assembly dimensions to vary according to the variations in the constituent parts. Since the gap vector loop comprises multiple parts, according to the Central Limit Theorem of probability analysis, a Gaussian probability distribution function describes the gap stack-up results, where the Gaussian probability distribution function is defined by the calculated gap mean and a standard deviation, which will be further described below.

Figure 5:
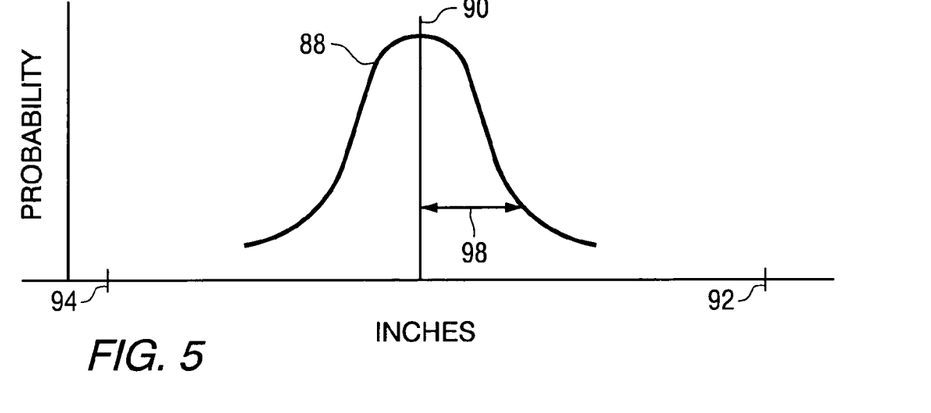
FIG. 5 is a graph depicting results of a statistical analysis for gap stack-up data secured according to the teachings of the present invention.

The graph of FIG. 5 illustrates one such Gaussian probability distribution function 88, where the mean value is identified by a reference character 90. A gap maximum value 92 is calculated by summing the upper tolerance values for the loop elements. A gap minimum value 94 is determined by summing the minimum tolerance values.

The variance of the gap Gaussian distribution function 88 can be determined as follows. According to one embodiment, it is assumed that each positive and negative tolerance value is within three standard deviations of the nominal dimension value, i.e., 3σ. Thus division of each tolerance value by three yields a standard deviation for each dimension in the gap vector loop. The standard deviation is a scalar quantity expressing magnitude only and does not include a sign. Thus the standard deviation values are not differentiated based on whether the value increases or decreases the gap dimension. The squares of each standard deviation value are summed and the square root of the sum is determined. The result is the standard deviation for the gap, indicated by a reference character 98 in FIG. 5. According to other embodiments, a different relationship between the standard deviation and the tolerance values can be assumed to calculate the standard deviation for the gap.

The contribution of a part tolerance to a variation of the gap dimension can be calculated by dividing the square of the standard deviation for the part tolerance of interest by the sum of the squares of the standard deviations of all dimensions in the gap. The larger the resulting percentage, the larger the contribution of that part tolerance to the gap dimension. If the gap stack-up reveals that the gap dimension is out-of-tolerance, the mean of one or more part dimensions are adjusted and/or a tolerance with the highest percentage contribution should be investigated to correct the out-of-tolerance condition.

Figure 6:
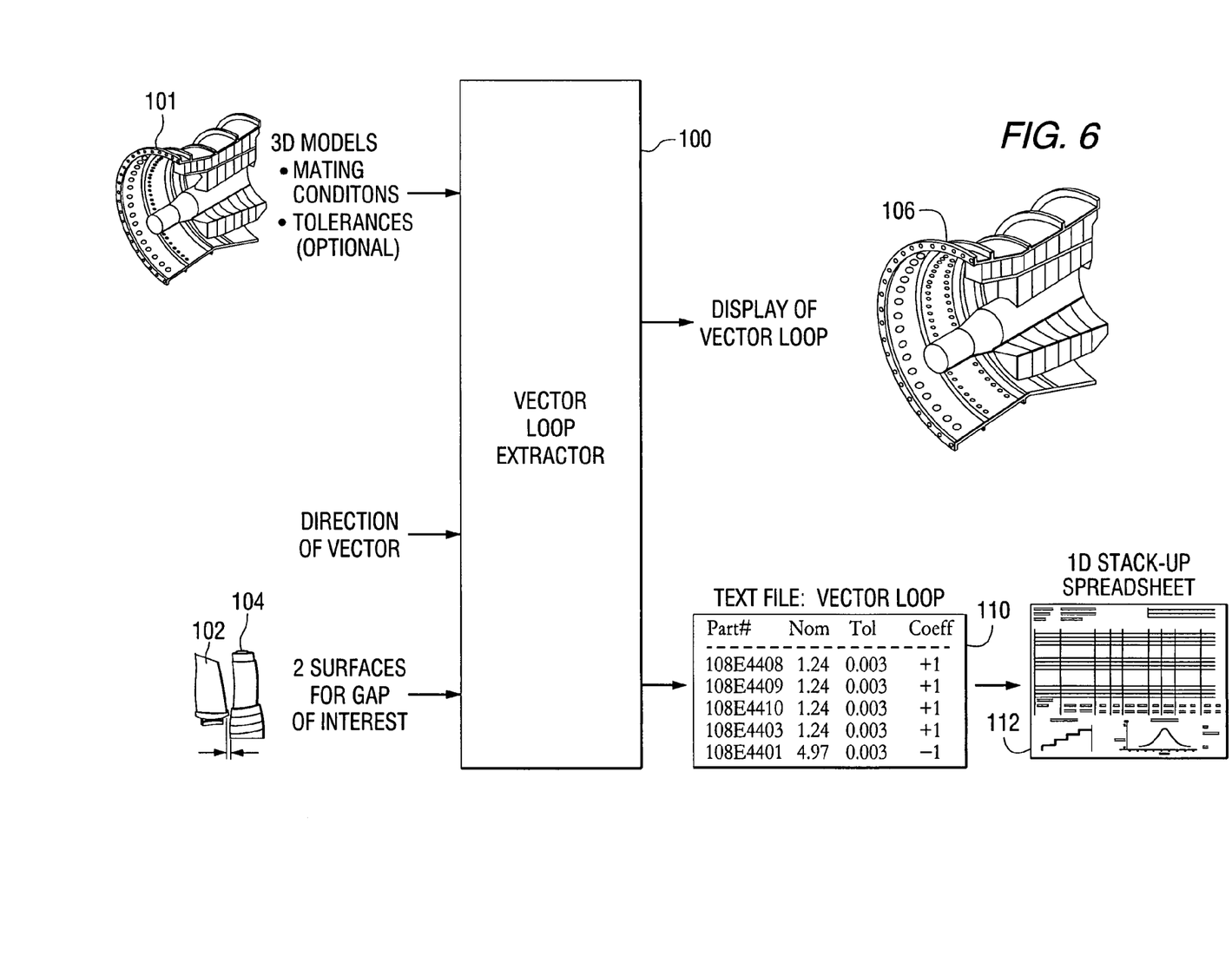
FIG. 6 is a block diagram depicting the input and output parameters for a vector loop extractor constructed according to the teachings of the present invention.

FIG. 6 depicts a vector loop extractor 100 according to the teachings of the present invention. Inputs to the extractor 100 include the three-dimensional models 101 from the CAD design program and the mating conditions of the constituent parts in the assembly for which the vector loop is to be extracted. Optionally, tolerances associated with the modeled assemblies are provided. The tolerance values are not required during the vector loop extraction process, but instead can be considered later in the process to determine complete the gap stack-up analysis. If not provided, the vector loop extractor 100 determines the gap vector loop and the nominal dimensions for each element in the loop. The nominal dimensions are summed (after multiplication by +1 or −1 as described above) to determine the gap nominal dimension, which is equivalent to the gap mean dimension. Without tolerance information during the vector loop extraction process, it is not possible to calculate the standard deviation of the gap. This calculation can be performed later when the tolerance information is made available.

The loop coefficient (+1 or −1) is determined for each part dimension based on a direction of traversal through the loop, which is provided to the vector extractor 100 as indicated. Finally, surfaces 102 and 104 that define the gap of interest are also provided as inputs.

Outputs from the vector loop extractor 100 comprise a display of the parts or elements that comprise the vector loop from the surface 102 to the surface 104. These parts can be superimposed on a displayed image of the model part 106. The engineer can then study the dimensions within the loop to ensure that each arrowhead in the loop begins at the termination of the previous arrowhead, and the first and last arrowheads terminate on the two surfaces that define the part, that is, surfaces 102 and 104 for example. The engineer can also check all part dimensions in the loop. These various manual check processes can be useful to validate the loop stack-up process.

An output text file 110 comprises a list of the parts in the vector loop, the nominal dimension of each part within the loop, the tolerance associated with that dimension (if the tolerance value was provided as an input in the three-dimensional model) and the loop coefficient associated with each dimension. A stack-up spreadsheet 112 includes the output text file 110 and the various statistical parameters discussed above. Other report configurations are possible based on data that is available and the user's specific output requirements.

Figure 7:
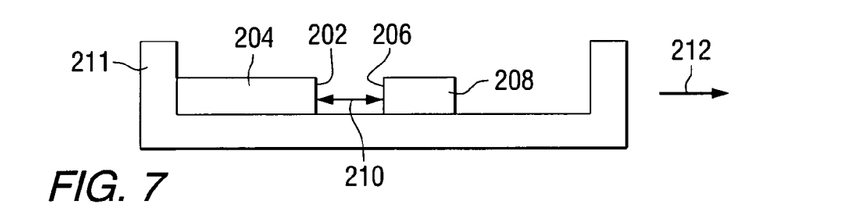
FIGS. 7-9 are elevation views of machine parts for illustrating certain features of the vector loop extractor of the present invention.

In a preferred embodiment of the present invention, the vector loop includes only dimensions/tolerances between part geometric planes where a normal to the plane is collinear with the direction of the vector loop or parts with a pin/hole mates where the axis of the pin/hole is perpendicular to the direction of the vector loop. For example, in FIG. 7 a plane 202 of a part 204 and a plane 206 of a part 208 define a dimension 210. The parts 204 and 208 are disposed in a tray 211. Since a normal to the interface between the planes 202 and 206 is collinear to a vector loop direction 212, the dimension 210 is included within the stack-up analysis.

Figures 8, 9:
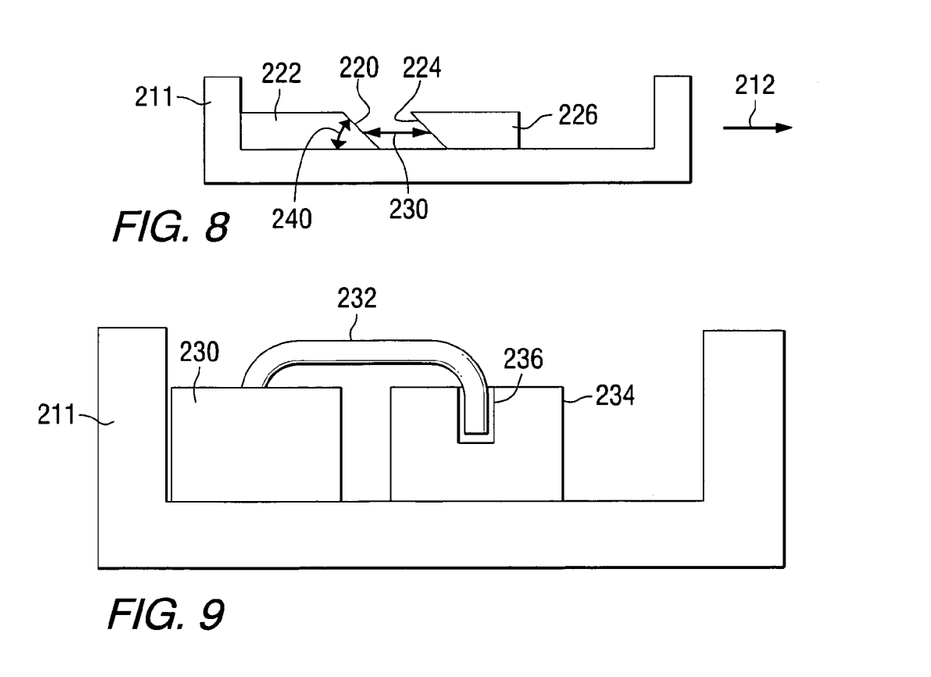

In FIG. 8 a plane 220 of a part 222 and a plane 224 of a part 226 define a dimension 230. A normal to the planes 220 and 224 is not collinear to the vector loop direction 212 and is therefore not included in the stack up analysis. In another embodiment of the present invention, the dimension 230 is included in the stack-up by analyzing the affect of a change in the angle 240 on the vector loop.

In FIG. 9 a part 230 comprising a pin 232 mates with a hole 236 defined in a part 234. Since an axis 240 of the pin 232/hole 236 is perpendicular to the direction of the vector loop, the pin/hole mating is included within the vector loop.

Figure 10:
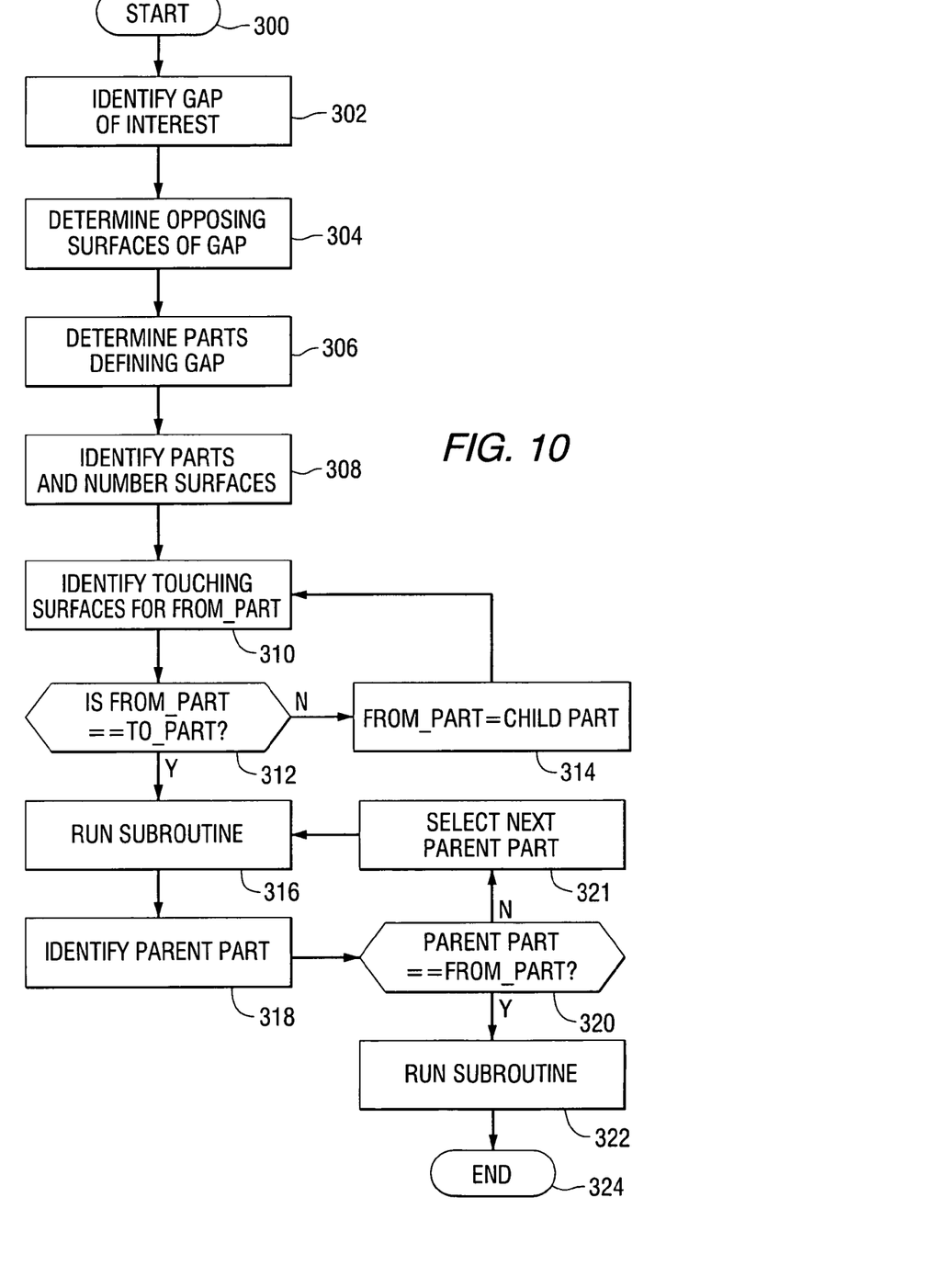
FIG. 10 is a flowchart for illustrating steps of a computer program executing components of a gap stack-up process according to the teachings of the present invention.

FIG. 10 illustrates a process flowchart associated with the vector loop extractor of the present invention. The embodiments of the invention may be embodied in the form of computer-implemented processes and apparatuses for practicing those processes. Embodiments of the invention may also be embodied in the form of computer program code written in any of the known computer languages, containing instructions embodied in tangible media, such as floppy diskettes, CD-ROMs, hard drives, DVDs or any other computer readable storage medium, wherein, when the computer program code is loaded into and executed by a general purpose or a special purpose computer, the computer becomes an apparatus for practicing the invention. An embodiment of the invention can also be embodied in the form of a computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a microprocessor, the computer program code segments cause the microprocessor to execute certain functions that perform the vector loop extraction process.

Figure 11:
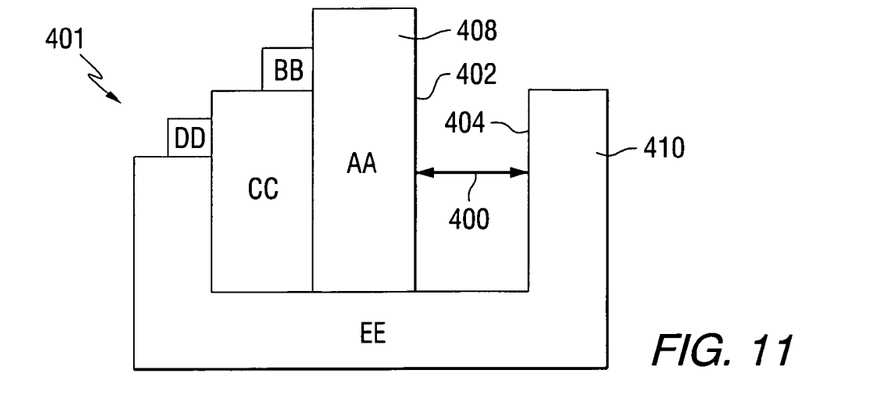
FIGS. 11 and 12 are elevation views of parts for determining a gap stack-up according to the process illustrated in FIG. 10.

The process begins at a start step 300 and continues to a step 302 for determining a gap of interest 400 of an assembly 401 (see FIG. 11). At a step 304 two opposing surfaces 402 and 404 defining the gap 400 are identified and the user indicates whether the gap stack-up is to be performed in an axial or radial direction (this selection may be required for certain pin/hole mating arrangements between two parts of a machine). At a step 306 two parts 408 and 410 comprising the two opposing gap surfaces 402 and 404, respectively, are determined. The parts 408 and 410 are referred to as the from_part 408 and the to_part 410.

Figure 12:
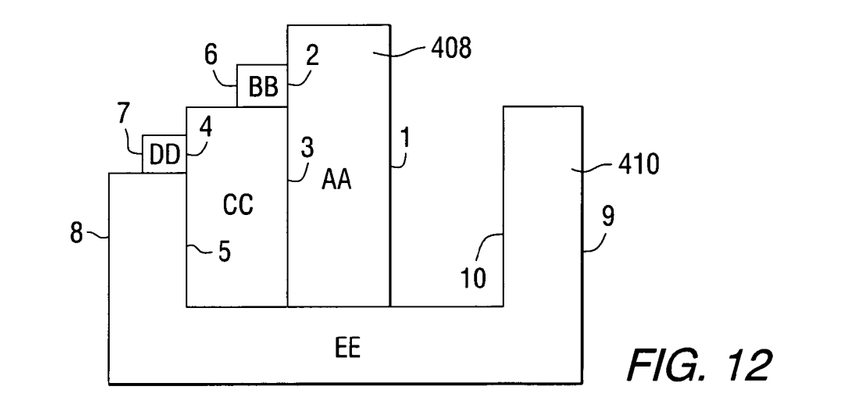

According to a step 308, all parts in the assembly 410 are identified and labeled (AA through EE in FIG. 11). The surfaces where two parts contact or touch, where the normal to the touching surfaces is collinear to the vector loop for the gap 400 are identified and numbered. All other surfaces are ignored. Thu surfaces of interest are numbered 1-10 in FIG. 12.

Beginning with the from_part 408, at a step 310 all parts that touch the from_part 408 (also designated AA in FIG. 11), where a normal to the touching surface is collinear with the gap vector loop (i.e., the loop for the gap 400) are identified by a two letter character, i.e., AA-BB. The parts so identified are referred to as children of the from_part 408 or part AA. Conversely, the from_part 408 is referred to as the parent of the identified parts. See FIG. 13, where the children of part AA (the from_part 408) are identified as BB and CC. The surface of the from_part AA touching the child part BB is surface 2, and the surface of the from_part AA touching child part CC is surface 3.

At a decision step 312 the process determines whether the from_part is equal to the to_part, that is, whether the complete vector loop has been traversed from the from_part 408 to the to_part 410. If the result of the decision step 312 is negative, then the process branches to a step 314 where one of the child parts from the from_part 408 is selected as the from_part for the next iteration through the program loop. For example, if the part BB is selected at the step 314, then no touching surfaces are identified at the step 310. The next iteration through the program loop selects the other child part of the from_part 408 (CC in this case) and the process continues to the step 310.

Processing continues through the loop comprising the steps 310 and 314 and the decision step 312 until the decision at the decision step 312 is affirmative. At this point, all the touching surfaces between parts have been identified and the process has created a graph illustrated in FIG. 13. All parts and their respective surfaces from the from_part 408 (AA) to the to_part 410 (EE) have been identified.

At a step 316, executed in response to an affirmative decision from the decision step 312, a subroutine for creating a vector loop within a part is executed. The subroutine, described in detail below, is first executed for the to_part 410 (EE). At a step 318 the parent part for the to_part 410 is identified. In this example part CC is identified as the parent part for the to_part 410 (EE). A decision step 320 determines whether the selected parent part is the from_part 408 (AA), that is, whether the subroutine has been executed for all parts in the vector loop, i.e., from the to_part 410 (EE) back to the from_part 408 (AA). A negative response branches back to a step 321 where the next parent part in the vector loop is identified and selected. For the second iteration through the exemplary, the part AA is selected. At the step 316 the subroutine is executed for the part selected at the step 321.

The process continues looping through the steps 316, 318 and 321 and the decision step 320 until the subroutine has been executed from the to_part 410 (EE) back to the from_part 408 (AA).

Figure 13:
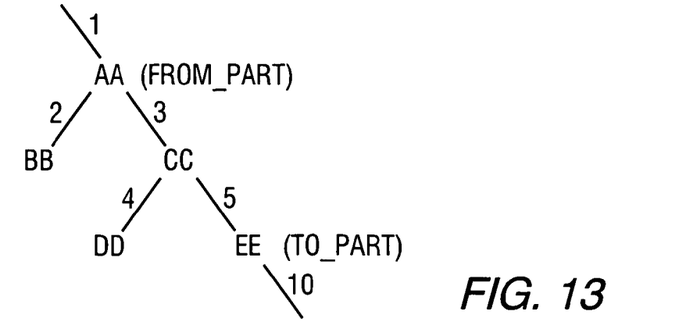
FIG. 13 is a graph illustrating interfacing parts for use in conjunction with the process illustrated in FIG. 10.

Returning to the decision step 320, an affirmative decision indicates that the subroutine has been executed for all parts except the from_part 408 (AA) in the FIG. 13 graph. From the affirmative decision branch of the decision step 320, processing continues to a step 322 where the subroutine is executed for from_part 408 (AA), and the program terminates at an end step 324.

The output of the FIG. 10 process comprises a sequence of triplets describing the vector loop. Each triplet comprises three elements: a part descriptor (by letter, for example) and two face numbers of the part, the first face number identifying the starting face and the second number identifying the ending face, i.e., the part is traversed from the starting face to the ending face. For example, the following triplets describe the FIG. 13 graph.

EE 10, 5
CC 5, 3
AA 3, 1

The process set forth in FIG. 14, to be described below, operates on each triplet (traversing the part from the starting face to the ending face) to determine a segment of the vector loop within each part. The various loop segments are sequentially concatenated to form the vector loop for the gap of interest. Although in the illustrated embodiment the FIG. 14 process is illustrated as executing after all the triplets have been determined, i.e., after the step 312 returns an affirmative answer, in another embodiment the FIG. 14 process can be executed for each triplet after each triplet is determined and then concatenated.

Figure 14:
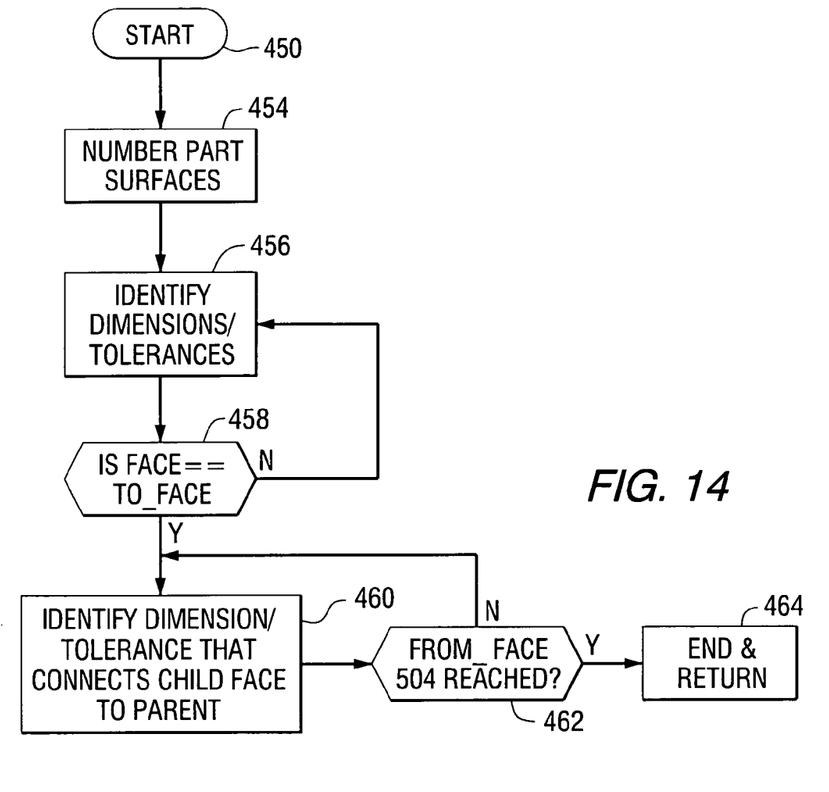
FIG. 14 is a flowchart for illustrating steps of a computer program executing components of a gap stack-up process according to the teachings of the present invention.
Figure 15:
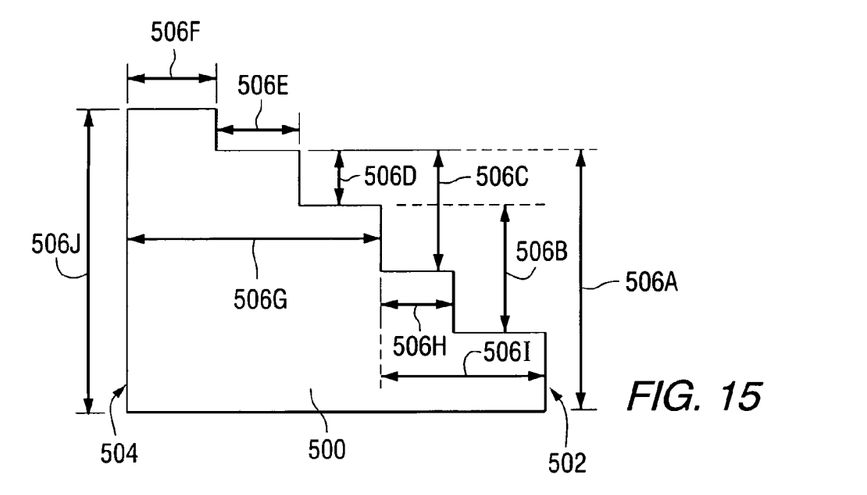
FIGS. 15 and 16 are elevation views of a part for determining a gap stack-up according to the process illustrated in FIG. 14.

The subroutine referred to in the FIG. 10 flowchart is illustrated in FIG. 14, beginning with a start step 450. An exemplary part 500 for which the subroutine is executed is illustrated in FIG. 15, comprising a to_face 502 and a from_face 504, and a plurality of dimensions/tolerances identified by double arrowheads 506A-506J. The part 500 is one of the part triplets described above, and the to_face 502 and the from_face 504 are also identified in the triplet.

Figure 16:
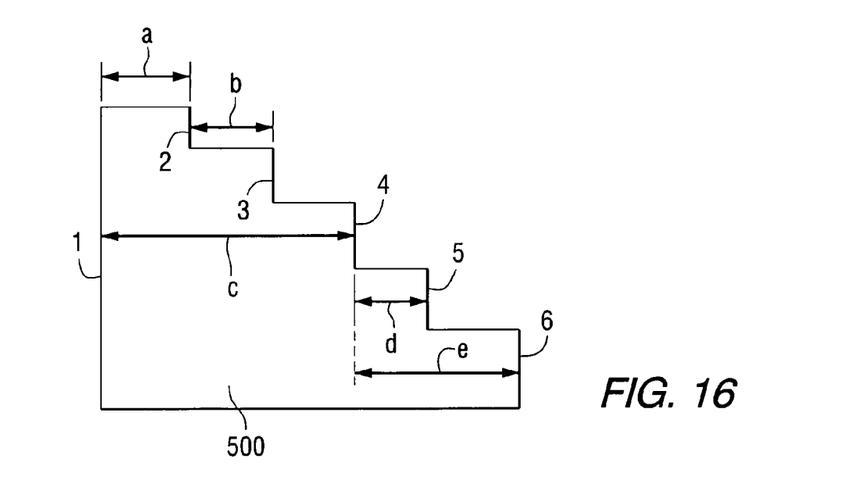

At a step 454, faces of the part 500 having a normal collinear with the gap vector loop are identified and labeled 1-6 as illustrated in FIG. 16, beginning with the from_face 504 and continuing to the to_face 502. All other faces of the part 500 are ignored.

Starting with the from_face 504 (also referred to as a face 1 in FIG. 16), at a step 456 dimensions/tolerances that originate at the face 1 and terminate on one of the faces numbered at the step 454 are identified. These faces are referred to as children of the from_face 504 or children of the face 1. A decision step 458 determines whether the to_face 502 has been identified as a child of the from_face 504. A negative response returns processing to the step 456 where another face of the part 500 is selected.

When the decision step 458 indicates that the to_face 502 has been reached, the decision step 458 returns an affirmative response. At this point all faces of interest of the part 500 have been identified. As can be seen in FIG. 16, the faces of interest include faces 2, 3, 4, 5 and 6 and their corresponding dimensions a, b, c, d and e. A graph of FIG. 17 illustrates the identified surfaces and the identified dimensions/tolerances.

The affirmative response from the decision step 458 branches processing to a step 460 where, beginning with the to_face 502 (i.e., the to_face 6) the corresponding parent face and the dimension/tolerance between the two faces are determined. According to FIG. 17, the parent face of the to_face 502 is the face 4 with the dimension/tolerance "e" therebetween.

Figure 17:
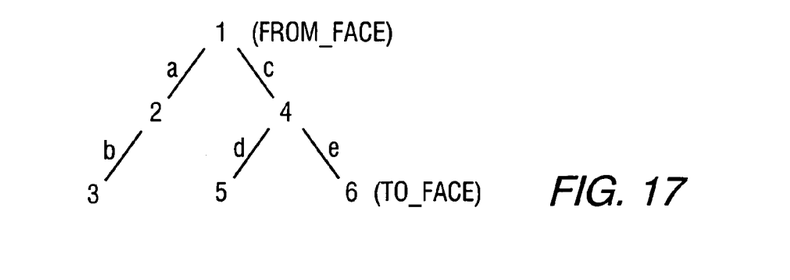
FIG. 17 is a graph illustrating interfacing faces of a part for use in conjunction with the process illustrated in FIG. 14.

The process continues to a decision step 462 to determine whether the from_face 504 has been reached as the process traverses through the graph of FIG. 17 in reverse from the to_face 6. If the from_face 504 has not been reached, the decision step 462 returns a negative response and loops back to the step 460 for selecting another face and the corresponding dimension/tolerance.

When the from_face 504 is reached, the decision from the decision step 462 is affirmative. The subroutine ends at a step 464 and processing returns to the process of FIG. 10 at the step where the subroutine was entered, i.e., the step 316 or the step 322.

Figure 18:
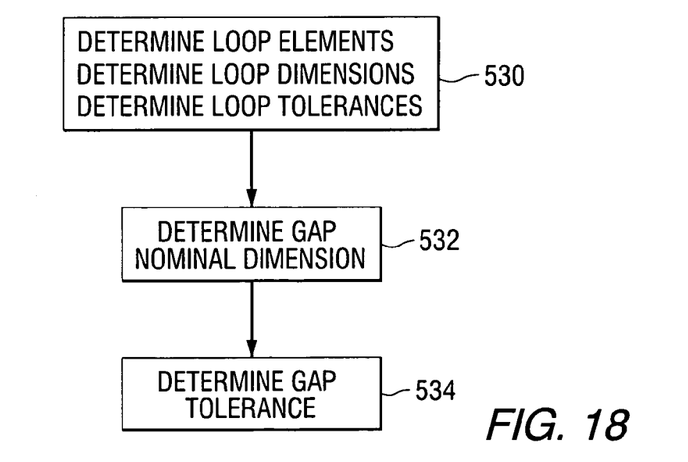
FIG. 18 is a flowchart for illustrating steps of a computer program executing components of a gap stack-up process according to the teachings of the present invention.

Thus the subroutine of FIG. 14 identifies the relevant dimensions/tolerances for each of the vector loop parts determined in the FIG. 10 process, and associates the dimension/tolerance with the part faces, after multiplication by the +1 or -1 as described above, to complete the loop stack-up analysis. A step 530 of FIG. 18 illustrates this process generally. As depicted by a step 532, the gap nominal dimension is determined as described above. A simple worst case tolerance sum can be calculated or statistical analysis, as described above, can be performed to calculate the gap tolerance, as depicted by a step 534. The resulting data can be set forth in a spreadsheet as described above in conjunction with FIG. 6.

In certain CAD design packages tolerance values are associated with the dimension such that if the dimension is modified during the design process, the tolerance is modified to reflect the dimensional change. These tolerances are known as "model-based tolerances" or "smart tolerances." The vector loop extractor of the present invention can accept such tolerance values.

In the embodiments described above, a loop coefficient of +1 or -1 was applied to each dimension value to account for dimensions that positively or negatively affect the gap dimension. In other embodiments, other loop factors are employed to represent conditions to which the part is exposed, e.g., during operation when the part is heated to a known temperature. To conduct a gap thermal analysis representing this operating condition, each part in the loop is analyzed to determine its expansion and contraction properties in response to the expected thermal conditions. These properties are then accounted for by selection of an appropriate loop factor. Assume that in response to an expected heating condition a dimension of a first part expands to 1.003 times its nominal room temperature value, and a dimension of a second part expands to 1.05 times it nominal value room temperature value. To conduct the gap thermal analysis the tolerance associated with the first nominal dimension is multiplied by 1.003 and the tolerance associated with the second dimension is multiplied by 1.05. The product of each gap loop tolerance and its thermal expansion coefficient is determined, and the products summed, with the result indicating the affect of gap heating on the gap dimension. A similar analysis can be conducted for part temperatures below nominal to determine the gap characteristics in response to part contraction.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth herein. In addition, modifications may be made to adapt a particular situation to the teachings of the present invention without departing from its essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for determining a one-dimensional gap stack-up for a gap within an assembly of parts, the method comprising:
   identifying a gap for stack-up analysis;
   identifying a first surface and a second surface defining the gap, wherein a first part of the assembly of parts comprises the first surface and a second part of the assembly of parts comprises the second surface;
   determining a vector loop comprising a plurality of elements from the first surface through the assembly of parts to the second surface, wherein the plurality of elements comprise the gap stack-up;
   determining at least one of a dimension and a tolerance for each one of the plurality of elements; and
   providing a list of each one of the plurality of elements and the at least one of the dimension and the tolerance associated therewith in a spreadsheet format to allow correction of tolerance values associated with an out-of-tolerance gap prior to completing the assembly of parts.

2. The method of claim 1 wherein the vector loop comprises vector loop segments, and wherein the step of determining the vector loop further comprises determining the vector loop segments between geometric planes of the assembly of parts for which a normal to the plane is collinear with the vector loop.

3. The method of claim 2 wherein the geometric planes comprise geometric planes between two parts of the assembly of parts.

4. The method of claim 2 wherein the geometric planes comprise geometric planes within a part of the assembly of parts.

5. The method of claim 1 wherein the vector loop comprises vector loop segments, and wherein a dimension is associated with each vector loop segment, and wherein the method further comprises combining the dimension associated with each of the vector loop segments to determine a gap stack-up dimension.

6. The method of claim 5 wherein the step of combining further comprises multiplying each dimension by a weight and summing the resulting products.

7. The method of claim 6 wherein the weight comprises a numerical value indicating the relationship between a change in the dimension of a vector loop segment and a change in the gap stack-up dimension.

8. The method of claim 7 wherein the weight comprises a +1 or a −1, and wherein the +1 weight indicates a direct relationship between the change in the dimension of the vector loop segment and the change in the gap stack-up dimension, and wherein a −1 weight indicates an inverse relationship between the change in the dimension of the vector loop segment and the change in the gap stack-up dimension.

9. The method of claim 6 wherein the weight comprises a numerical value indicating the relationship between a change in a dimension of a vector loop segment caused by a change in an environmental condition to which the assembly of parts is subjected and a change in the gap stack-up dimension resulting from the change in the environmental condition.

10. The method of claim 9 wherein the change in the environmental condition comprises a thermal environmental change.

11. The method of claim 1 further comprising providing a three-dimensional representation of the assembly of parts, wherein the step of identifying the gap further comprising identifying the gap from the three-dimensional representation.

12. The method of claim 1 further comprising providing a three-dimensional representation of the assembly of parts, wherein the step of identifying the first and the second surfaces further comprises identifying the first and the second surfaces from the three-dimensional representation.

13. The method of claim 12 further comprising superimposing a representation of the vector loop on the three-dimensional representation of the assembly of parts.

14. The method of claim 12 wherein the three-dimensional representation comprises a representation provided by a computer-aided design system.

15. The method of claim 1 wherein the step of determining the vector loop further comprises determining a plurality of dimensions in the vector loop between the first surface and the second surface.

16. The method of claim 15 wherein each of the plurality of dimensions includes an associated tolerance.

17. The method of claim 16 further comprising combining the tolerances to determine the gap tolerance.

18. The method of claim 17 wherein the step of combining further comprises summing the tolerances.

19. The method of claim 17 wherein the step of combining further comprises:
   determining a relationship between each tolerance and a standard deviation for the dimension with which the tolerance is associated;
   determining the standard deviation for each dimension; and
   determining the standard deviation of the gap according to the root sum of the squares of the standard deviation.

20. The method of claim 19 wherein the relationship between the tolerance and a standard deviation for the dimension comprises the standard deviation=tolerance/3.

21. The method of claim 1 further comprising
   determining at least one of the gap dimension and the gap tolerance by combining the respective dimension and tolerance of each one of the plurality of elements; and
   providing the gap tolerance and the gap dimension in the spreadsheet format.

22. The method of claim 1 wherein the vector loop comprises vector loop segments, and wherein one or more of the vector loop segments comprises a mating pin and hole, wherein an axis of the pin and hole combination is perpendicular to the vector loop.

23. A method for determining a vector loop within an assembly of parts, comprising:
   (a) identifying a loop from-face of a first part and a loop to-face of a second part of the assembly of parts, wherein the vector loop extends therebetween;
   (b) identifying parts in contact at a contact face within the assembly of parts, wherein a normal to the contact face is collinear with the vector loop, and wherein each identified part comprises a part from-face and a part to-face, and wherein the vector loop extends from the loop from-face of the first part, through the from-face and the to-face of each succeeding part in contact at the contact face, to the loop to-face of the second part;

(c) for each part identified in the step (b), determining at least one of a dimension and a tolerance between the loop from-face and the loop to-face to allow correction of tolerance values associated with an out-of-tolerance gap; and (d) providing the corrected tolerance values to allow completing the assembly of parts.

24. The method of claim 23 wherein the step (b) further comprises:

(b1) determining all parts within the assembly of parts;

(b2) determining adjacent parts in contact at a contact face, wherein a normal to a contact face is collinear with the vector loop;

(b3) beginning with the loop to-face of the second part, traversing the contact faces determined at the step (b2) back to the loop from-face of the first part, wherein each part encountered during traversal is entered at the part from-face and exited at the part to-face; and (b4) determining at least one of the dimension and the tolerance between the part from-face and the part to-face for each part encountered at the step (b3).

25. The method of claim 24 wherein the step (b4) further comprises:

(b4.1) determining all faces of the part wherein a normal to the face is collinear with the vector loop; and (b4.2) determining from among the faces determined at the step (b4.1) at least one of the dimension and tolerance that contributes to the dimension or the tolerance between the part to-face and the part from-face.

26. A computer program product for performing a one-dimensional gap stack-up for a gap within an assembly of parts, the computer program product comprising:

a storage medium readable by a computer processor and storing program code for execution by the computer processor, the program code comprising:

a program code module for identifying a gap for stack-up analysis;

a program code module for identifying a first surface and a second surface defining the gap, wherein a first part of the assembly of parts comprises the first surface and a second part of the assembly of parts comprises the second surface; and a program code module for determining a vector loop comprising a plurality of elements from the first surface through the assembly of parts to the second surface, wherein the plurality of elements comprise the gap stack-up to allow correction of tolerance values associated with an out-of-tolerance gap prior to completing the assembly of parts.

27. The computer program product of claim 26 further comprising a program code module for identifying at least one of a dimension and a tolerance for each one of the plurality of elements.

28. The computer program product of claim 27 further comprising a program code module for determining at least one of a mean gap dimension and a standard deviation of the mean dimension in response to the respective dimension and tolerance for each one of the plurality of elements.

* * * * *